(12) United States Patent
Shapira et al.

(10) Patent No.: US 9,697,261 B2
(45) Date of Patent: Jul. 4, 2017

(54) APPLICATION REPRESENTATION FOR APPLICATION EDITIONS

(71) Applicant: Quixey, Inc., Mountain View, CA (US)

(72) Inventors: Liron Shapira, Mountain View, CA (US); Nicolas Tarleton, Berkeley, CA (US); Tomer Kagan, Sunnyvale, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

(21) Appl. No.: 15/250,838

(22) Filed: Aug. 29, 2016

(65) Prior Publication Data

US 2016/0371341 A1 Dec. 22, 2016

Related U.S. Application Data

(63) Continuation of application No. 14/932,337, filed on Nov. 4, 2015, now Pat. No. 9,430,553, which is a continuation of application No. 13/840,727, filed on Mar. 15, 2013, now Pat. No. 9,201,946.

(60) Provisional application No. 61/650,313, filed on May 22, 2012, provisional application No. 61/638,982, filed on Apr. 26, 2012.

(51) Int. Cl.
*G06F 7/00* (2006.01)
*G06F 17/30* (2006.01)

(52) U.S. Cl.
CPC .. *G06F 17/30539* (2013.01); *G06F 17/30011* (2013.01); *G06F 17/3053* (2013.01); *G06F 17/30053* (2013.01); *G06F 17/30312* (2013.01); *G06F 17/30477* (2013.01); *G06F 17/30483* (2013.01); *G06F 17/30554* (2013.01); *G06F 17/30598* (2013.01); *G06F 17/30864* (2013.01)

(58) Field of Classification Search
CPC .......... G06F 17/30598; G06F 17/3053; G06F 17/30011; G06F 17/30053
See application file for complete search history.

(56) References Cited

U.S. PATENT DOCUMENTS

| | | | |
|---|---|---|---|
| 5,625,554 A | 4/1997 | Cutting et al. | |
| 6,556,983 B1 | 4/2003 | Altschuler et al. | |
| 8,548,878 B1 | 10/2013 | Graham et al. | |
| 8,762,360 B2 | 6/2014 | Jiang et al. | |
| 8,825,663 B2 | 9/2014 | Mahaniok et al. | |
| 8,924,958 B1 | 12/2014 | Bangur et al. | |
| 2004/0143600 A1* | 7/2004 | Musgrove | G06F 17/30864 |

(Continued)

*Primary Examiner* — Charles Lu
(74) *Attorney, Agent, or Firm* — Harness, Dickey & Pierce, P.L.C.

(57) ABSTRACT

A hardware module for an application search system includes a data processing module that generates a plurality of canonical application structures each identifying a canonical application, a plurality of application editions associated with the canonical application, and respective attributes associated with the at least one application edition. The data processing module generates search indexes including the plurality of canonical application structures and the respective attributes. An application search module receives a search query from a user, selects at least one of the search indexes based on the search query and the respective attributes, identifies an initial set of canonical applications using the selected search index based on the search query, generates search results based on the initial set of canonical applications, and provides the search results to the user.

19 Claims, 9 Drawing Sheets

(56) References Cited

U.S. PATENT DOCUMENTS

| | | |
|---|---|---|
| 2006/0184932 A1 | 8/2006 | Burnley et al. |
| 2007/0043578 A1 | 2/2007 | Betz et al. |
| 2007/0299940 A1 | 12/2007 | Gbadegesin et al. |
| 2008/0140617 A1* | 6/2008 | Torres ............... G06F 17/30389 |
| 2011/0019925 A1* | 1/2011 | Luk .................. G06F 17/30997 |
| | | 382/218 |
| 2011/0131237 A1 | 6/2011 | Macaluso |
| 2011/0250872 A1 | 10/2011 | Kim et al. |
| 2012/0075469 A1 | 3/2012 | Oskin et al. |
| 2012/0191694 A1 | 7/2012 | Gardiol et al. |
| 2012/0240236 A1 | 9/2012 | Wyatt et al. |
| 2012/0316955 A1 | 12/2012 | Panguluri et al. |
| 2013/0191397 A1* | 7/2013 | Avadhanam ........ G06F 17/3053 |
| | | 707/748 |

\* cited by examiner

APPLICATION REPRESENTATION FOR APPLICATION EDITIONS

CROSS-REFERENCE TO RELATED APPLICATIONS

The present application is a continuation of U.S. patent application Ser. No. 14/932,337 filed Nov. 4, 2015, now U.S. Pat. No. 9,430,553, which is a continuation of U.S. patent application Ser. No. 13/840,727, filed Mar. 15, 2013, now U.S. Pat. No. 9,201,946, which claims the benefit of U.S. Provisional Application No. 61/638,982, filed Apr. 26, 2012 and U.S. Provisional Application No. 61/650,313, filed May 22, 2012. The entire disclosures of the applications referenced above are incorporated by reference.

FIELD

The disclosure generally relates to the field of application search, and more particularly to the automatic clustering of application editions for relevant information retrieval.

BACKGROUND

In recent years, use of computers, smartphones, and other Internet-connected devices has grown exponentially. Correspondingly, the number of available applications for such devices has also grown. Today, many diverse applications can be accessed on any number of different devices, including, but not limited to, smartphones, personal computers, refrigerators, automobiles, and televisions. These diverse applications can range from business driven applications, games, educational applications, news applications, shopping applications, efficiency applications, messaging applications, video chatting applications, media streaming applications, social networking applications, and so much more. Furthermore, application developers develop vast amounts of applications within each genre and each application may have numerous editions.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method, and computer readable storage medium includes clustering application editions of one or more applications (also referred to herein as a canonical application) in order to facilitate function-based application search. As used herein, a canonical application (also referred to herein as simply an application) can refer to an object or entity that provides a core set of functionalities, while an application edition (also referred to herein as simply an edition) refers to a particular implementation or variation of the application. In one aspect, clustered application editions may be organized into a canonical application structure. The canonical application structure may be a logical entity comprising various editions that have been determined to be associated with the same canonical application or source. An application representation can include a canonical application and a group of one or more application editions. Furthermore, the application representation can include attributes corresponding to the canonical application ("general attributes"), and attributes corresponding to the application editions ("edition attributes").

In one particular embodiment, information about one or more applications, including application editions, are aggregated from numerous data sources. The application editions identified in the aggregated information are clustered based on heuristics, and canonical application structures associated with the clustered application editions are generated. At a later time, when a search query is received, the generated canonical application structures are searched according to the received search query. Thereafter, search results identified during the search are displayed or provided for display according to the canonical application structures. Alternatively, specific application editions may be displayed according to filters applied to the search results, rather than the canonical applications.

System Architecture

Figure 1:
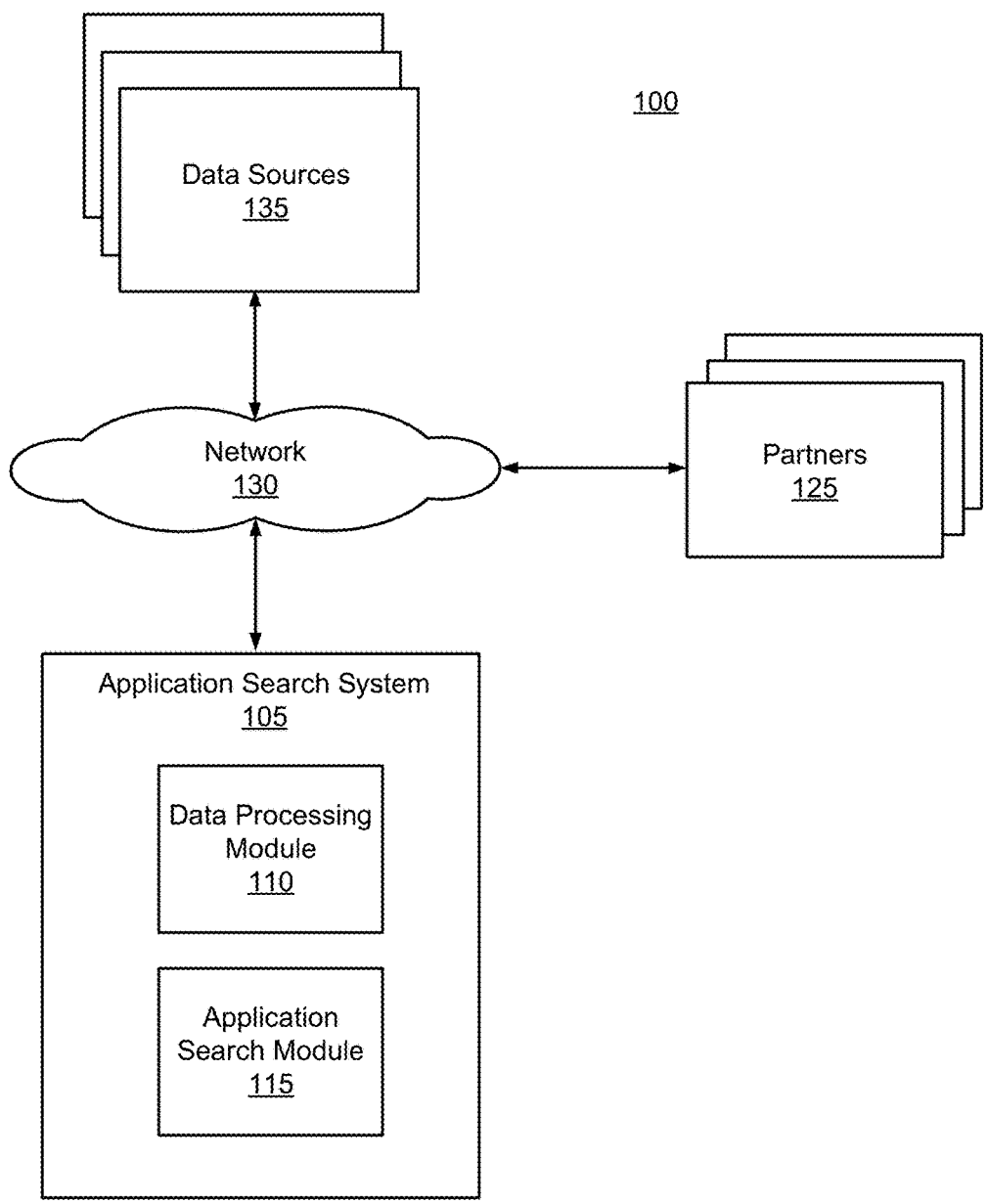
FIG. 1 illustrates one embodiment of an example environment for performing function-based application search.

FIG. 1 is a high-level block diagram illustrating a typical environment 100 used for performing function-based application searches, according to one embodiment. The operations described herein may be performed by one or more computing systems, such as computing system 100. As discussed, an application can be a representation of software that provides a core set of functionalities. Examples of applications include MICROSOFT WORD, YELP, FACEBOOK, etc. As also discussed, an edition may refer to a particular implementation or variation of an application. For example, an edition may be a particular version (e.g., version 1.0 of an application, version 2.0 of an application), a particular implementation for a specific platform (e.g., an implementation for iOS, ANDROID, WWW), an implementation with certain functional characteristics (e.g., a light version, an advanced user version), an implementation with certain aesthetic characteristics (e.g., a holiday themed version), etc. Illustratively, an edition for the canonical application YELP can refer to the website over which the functionalities of YELP.COM may be accessed. Another edition of the application YELP can refer to software for the iOS environment over which the functionalities of YELP.COM may also be accessed.

Referring to FIG. 1, the environment 100 includes a network 130, one or more data sources 135, one or more partners 125, and an application search system 105. Each of the one or more data sources 135, one or more partners 125, and application search system 105 may be in communication with one another via the network 130. Only one application search system 105, three data sources 135, and three partners 125 are shown in FIG. 1 for purposes of clarity, but those of skill in the art will recognize that typical environments can have multiple data sources 135 and partners 125, and can also have multiple application search systems 105.

The network 130 enables communications between the various entities of the environment 100. In one embodiment, the network 130 uses standard communications technologies and/or protocols. Thus, the network 130 can include links using technologies such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

The data sources 135 provide data regarding one or more applications to the application search system 105. The data sources 135 may include any suitable data providers, including operators of application stores, application developers, application catalogs, websites (e.g., blogs, application review sites, etc.), and/or the like. In one embodiment, each data source 135 may have its own distinct interface, content, update rate, etc.

The partners 125 provide search queries to the application search system 105 and receive search results based on the queries. As used herein, a partner 125 may be a third party entity (e.g., a company or other organization) or an end user that leverages the search functionality of the system 105. In some instances, a partner 125 may be a third party entity that leverages the search functionality of the system 105 via its own website or portal. For example, a partner 125 may display an application search bar on its website. The partner's end users (for ease of understanding also referred to herein as partners) may interact with the search bar to send search queries to the system. In other instances, a partner 125 may be an end user that directly interfaces with a website or portal provided by the system 105.

The application search system 105 performs searches for applications based at least in part on application functionality. In one aspect, the application search system 105 matches search queries to applications based on inferred or derived functional capabilities of the search queries and applications rather than only on explicit matches of the keywords associated with the search queries and applications. In one embodiment, the application search system 105 further automatically identifies, clusters, and cross-references various editions of an application. Information for the clustered and cross-referenced editions may be used to improve the quality of search results generated by the application search system 105.

Figure 2:
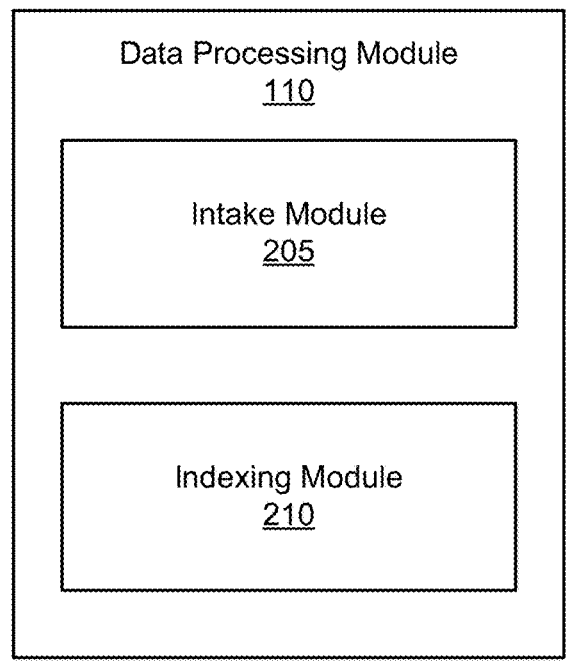
FIG. 2 is a high-level block diagram illustrating a detailed view of example modules within a data processing module, according to one embodiment.

As shown in FIG. 1, the application search system 105 includes a data processing module 110 and an application search module 115. Some embodiments of the application search system 105 have different and/or other modules than the ones described herein. Similarly, the functions can be distributed among the modules in accordance with other embodiments in a different manner than is described here. Likewise, the functions can be performed by other entities.
Data Processing Module FIG. 2 is a high level block diagram illustrating a detailed view of modules within the data processing module 110 according to one embodiment. The modules described in accordance with FIG. 2 are executable by one or more computer systems, e.g., computer system 100. Some embodiments of the data processing module 110 have different and/or other modules than the ones described herein. Similarly, the functions can be distributed among the modules in accordance with other embodiments in a different manner than is described here. Likewise, the functions can be performed by other entities. The data processing module 110 includes modules for performing various functions. These modules include an intake module 205 and an indexing module 210.

The intake module 205 receives data from one or more of the data sources 135. The data may be later used to support function-based application search. In one embodiment, the data received from the data sources 135 may include information about one or more applications. In one embodiment, at least some of the data received from the data sources 135 may include information regarding the functionalities of the one or more applications.

The indexing module 210 generates one or more search indexes usable for supporting function-based application search. In order to generate the indexes, the indexing module 210 identifies canonical applications and editions associated with the canonical applications from the data received by the intake module 205. The identified canonical application and editions can be represented in a canonical application structure. The indexing module 210 additionally extracts attributes for the identified applications. At least some of the extracted attributes may relate to functional aspects of the identified applications. Based on the representations, one or more search indexes can be generated for supporting function-based application search.

Indexing Module

Figure 3:
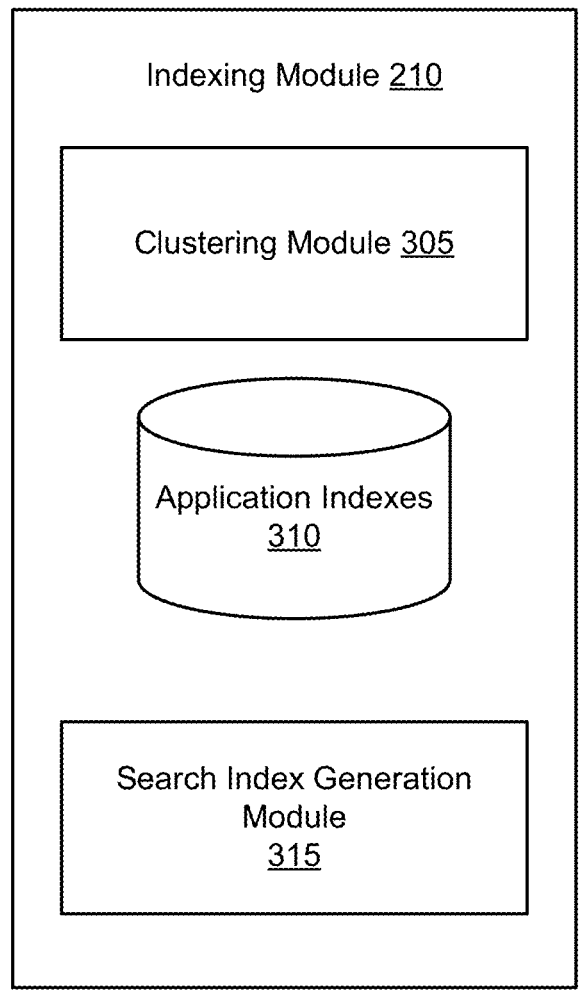
FIG. 3 is a high-level block diagram illustrating a detailed example view of modules within an indexing module, according to one embodiment.

FIG. 3 is a high level block diagram illustrating a detailed view of modules within the indexing module 210 according to one embodiment. Some embodiments of the indexing module 210 have different and/or other modules than the ones described herein. Similarly, the functions can be distributed among the modules in accordance with other embodiments in a different manner than is described here. Likewise, the functions can be performed by other entities. The indexing module 210 includes components for performing various functions, including a clustering module 305, application indexes 310, and a search index generation module 315.

The clustering module 305 gathers information obtained from numerous data sources, such as the data sources 135, and transforms the information into a suitable structure or format for processing. For example, the information may be transformed such that the data can be used to identify a collection of application editions and their corresponding descriptions. In one embodiment, the information may be structured into a set of entries for identified application editions and corresponding metadata fields describing the editions.

In one embodiment, the clustering module 305 clusters application editions by identifying similar application editions and grouping the similar application editions together. As used herein, similar editions are application editions having the same core functionality, with each edition being an implementation or variation of the core functionality. The similar application editions may be identified based on heuristics. In one embodiment, clustering module 305 may assess an application edition to determine which canonical application is the best fit, if any. If certain a canonical application is identified the application edition may be under that respective canonical application. If the application edition does not fit under any canonical application that is indexed, then a new canonical application is generated. Example categories of attributes that may be used to assess association of an application edition with a particular canonical application may include an application edition name, URLs to the application edition, a name or URL associated with the application edition's developers. Other attributes may also be used to compare application editions.

In one embodiment, the clustering module 305 may improve clusters of application editions by executing a predefined set of one or more specific heuristics to ensure certain editions are captured during the clustering phase. For example, while comparing one application edition name with one or more canonical applications, the clustering module 305 may employ a heuristic to ignore certain words while comparing names of application editions or developers. For example, words such as "free," "limited edition," "new," "inc," "co," "ltd," etc. may not be considered for comparison during the clustering process. As another example, the clustering module 305 may identify a root word of the edition's name, and compare the root word to one or more root words of the canonical application's title. As yet another example, the clustering module 305 may not include an edition's URL in the clustering process if the URL includes a frequently-used domain (e.g., "appspot.com"). The result of clustering is a number of sets of similar application editions.

Figure 4:
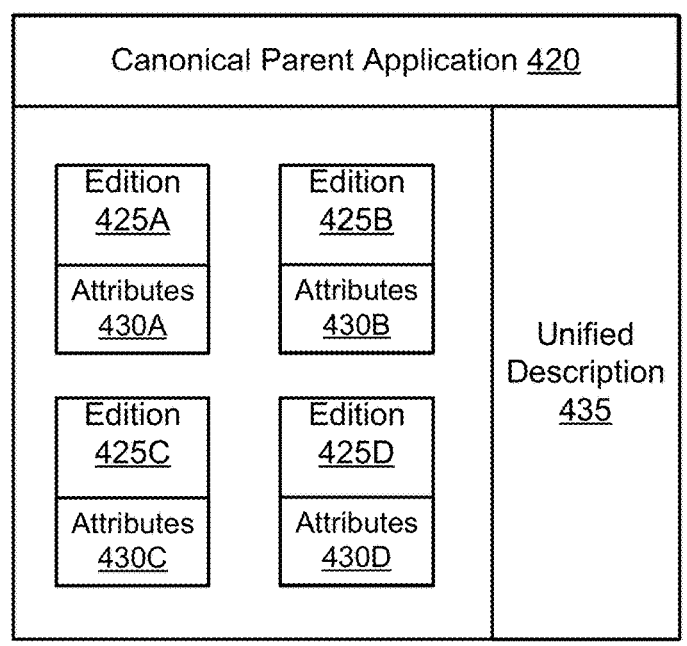
FIG. 4 illustrates an example canonical application structure, according to one embodiment.

In one implementation, each set of one or more application editions is organized into a canonical application structure, illustrated by way of example in FIG. 4. As illustrated in FIG. 4, application editions 425 are similar application editions identified by the similarity measures. A canonical application 420 embodies the editions 425. In one aspect, an individual canonical application structure is a logical entity that includes information regarding the different editions of a canonical application and information for a unified description 435 of the canonical application.

In one aspect, the canonical application structure may include functional and/or other attributes 430 common to all application editions respective to that canonical application. An application attribute may refer to any information about an application and/or edition that can be extracted from data received at least from the data sources 135.

Examples of attribute types may include functional type attributes (e.g., attributes related to application battery usage, bandwidth usage, general operational functionality, etc.). Other examples of attributes types include identification type attributes (e.g., attributes related to an application's title, publisher information, etc.), sentiment type attributes (e.g., attributes related to an application's popularity), and/or the like. The various types of attributes 430 can broadly be categorized as general attributes, which are attributes of the canonical application, or edition attributes, which are attributes of the applications editions. General attributes of the canonical application may for example include importance of the application, where importance is a weighted combination of normalized download rate of the editions associated with the canonical application and normalized review scores of the editions. Edition attributes may for example include battery power or bandwidth used by the edition.

Extraction of the attributes 430 from received data can proceed in any suitable manner. For example, attributes 430 may be extracted directly from text of the received data if the received data explicitly indicates an attribute. Alternatively, attributes 430 may be extracted by making inferences related to the text of a document or based on any fields in the document from the received data, or by combining data from different sources and analyzing different combinations of the received data and/or other data. Attributes 430 may also be extracted based on logged data associated with the application edition or sources of the received data.

User reviews through various blogs, tweets, discussion boards, application stores and/or websites may also be incorporated into attributes of each application. These reviews may be analyzed by the system to evaluate rank and functionality of the application edition. The description of the applications may also be considered. These descriptions may be present on the stores or various other sites from where user can download the application edition. The descriptions may be entered and maintained by the developer of the corresponding application edition, or by a webmaster of stores corresponding to an application edition. Other rank-affecting factors may additionally or alternatively contribute to the generation of the attribute values associated with each canonical application or application edition.

In one implementation, the edition attributes 430 may be seen as metadata associated with each edition in a canonical application structure. The edition attributes 430 can identify information needed to differentiate the editions 425 within the canonical application structure. The attributes 430 may correspond to, for example, ratings, download count, reviews, description, or other factors of each application edition. The ratings may refer to star-ratings of the application inside the canonical application, or may refer to individual site or store ratings. The ratings may be calculated on various bases such as popularity or search rating (i.e., number of times a particular query is entered). Such ratings may contribute to a ranking for the canonical applications while searching based on a user query. The download count may refer to the number of times a particular application edition is downloaded. For example, a greater download count may specify that the application edition is popular among the users.

In one implementation, the canonical application structure may be organized according to an application-search specific schema as described in U.S. patent application Ser. No. 13/842,215, entitled "Updating a Search Index Used to Facilitate Application Searches," filed Mar. 15, 2013, which is incorporated by reference in its entirety. Additional details are also described in U.S. patent application Ser. No. 13/839,188, entitled "Performing Application Search Based on Entities," filed Mar. 15, 2013, which is incorporated by reference in its entirety. More specifically, the application-search specific schema may specify the attributes that are to be extracted for each application. The application-search specific schema may further indicate the manner in which the extracted attributes are to be organized. For example, the application-search specific schema may indicate that certain attributes (e.g., general attributes) be grouped under the general canonical application structure whereas other attributes (e.g., edition attributes) may be organized as part of each edition of the corresponding canonical application. Illustratively, an attribute for developer may be organized under the general canonical application whereas a platform attribute may be organized as part of each edition of the canonical application.

With respect to the unified description 435 for the canonical application 420, such information can be extracted from the information and/or metadata for the editions of the canonical application. That is, the functional and/or other attributes of various application editions 425 may be propagated onto the generic description 435 of the canonical application 420 in the canonical application structure. For example, each edition of a particular application may be associated with image conversion. Thus, the image conversion functionality may be propagated onto the generic description of the canonical application. Similarly, information associated with a canonical application may be propagated to each edition associated therewith, such that one edition receives data from other related editions.

In one aspect, the clustering module 305 performs clustering in a bottom-up process where similar application editions are grouped into a single cluster. In another embodiment, the clustering module 305 performs clustering in a top-down process where a canonical application is created when a new application is detected. Information describing the canonical application may be updated gradually as other editions are discovered and added to the cluster.

Application editions may also be clustered at multiple levels. For example, the clustering module 305 may identify a number of editions corresponding to different aesthetic characteristics (e.g., a regular edition and a holiday-themed edition), which are clustered under one canonical application. Each of these first-level editions may also have its own editions corresponding to different platforms (e.g., the holiday-themed edition for iOS, the holiday-themed edition for Android, etc.), which may be clustered under the first-level editions.

Following generation of the canonical application structures, the search index module 315 generates one or more search indexes. Each search index may be data structures populated with the canonical application structures of the applications. The search indexes may later be used to perform function-based application searches.

In one embodiment, the generated indexes are stored in the application index 310 as shown in FIG. 4. In one embodiment, the generated indexes may be updated periodically (e.g., at regular intervals) so that up to date results can be provided to requesting partners.

Application Search Module

In one embodiment, a user (via a client device) can send a query for application recommendations to the application search system 105. In response, the application search module 115 can identify canonical application results and/or application results based on the application indexes 310 and on the user's query. In an embodiment, the results are retrieved in the form of clustered editions, which are ranked based on machine learning and heuristics. In one embodiment, the different results can be ranked based on, but not limited to, data collected from reviews, user recommendations, download count, ratings, descriptions and other rank affecting factors. The ranked results can thereafter be provided to the requesting user by sending the results to the user's client device.

Figure 5:
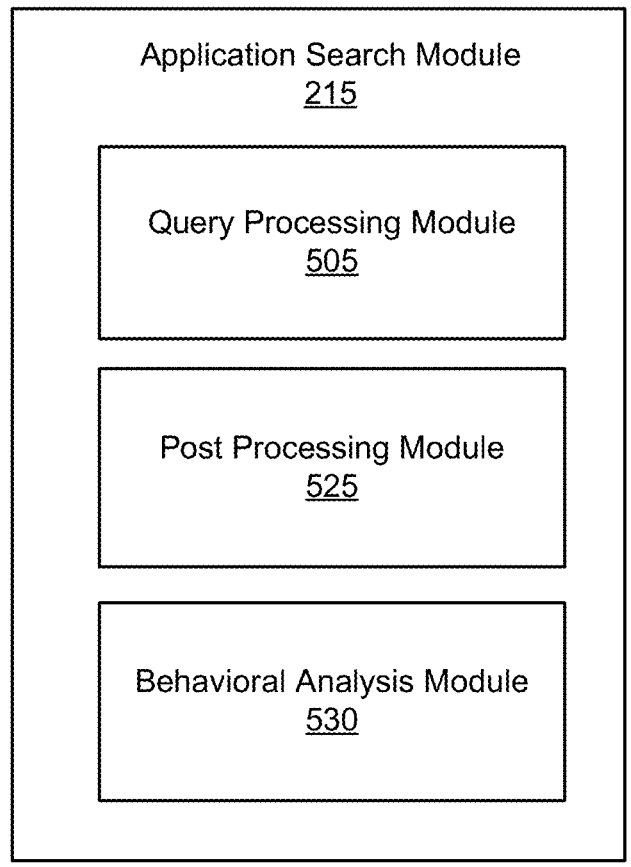
FIG. 5 is a high-level block diagram illustrating an example detailed view of modules within an application search module, according to one embodiment.

FIG. 5 is a high level block diagram illustrating a detailed view of modules within the application search module 115 according to one embodiment. Some embodiments of the application search module 115 have different and/or other modules than the ones described herein. Similarly, the functions can be distributed among the modules in accordance with other embodiments in a different manner than is described here. Likewise, the functions can be performed by other entities. The application search module 115 includes modules for performing various functions. These modules include a query processing module 505, a post processing module 525, and a behavioral analysis module 530.

The query processing module 505 processes queries received from one or more partners. In one embodiment, the query processing module 505 receives an input Q from a partner. The input Q may include a search query and additional context information for the query, such as platform constraint information, geo-location preferences, partner specific information, etc. Based on the input Q, the query processing module 505 generates a set of queries. In addition to constructing the set of queries, the query processing module 505 additionally generates a set of query features $F_q$ based on the received search query. A query feature may be any suitable information related to a search query. For example, a query feature may include information indicating a number of words in a search query. Other query features might include predicted concepts or desired categories of the search query, such as a "games" query category. Query features can also include information specifying the popularity or frequency of the received search query.

After processing the query, the query processing module 505 identifies an initial set of canonical applications and a corresponding set of attribute data based on the generated set of queries. To identify the initial set of applications and attribute data, the query processing module 505 automatically identifies one or more search indexes matching the set of queries. As discussed, the application search system 105 may include a number of search indexes. Illustratively, a received search query may include the query "Secure banking applications that work with my IPHONE." Because the query includes the term IPHONE, the query processing module 505 may automatically select an index including a set of applications limited to the IPHONE platform. The query processing module 505 may additionally automatically select an index including a set of applications determined to have a particular threshold level of security. After selection of the one or more indexes, the query processing module 505 identifies an initial set of applications and corresponding attribute data by querying the selected indexes using the set of queries.

Following identification of the initial set of applications, the query processing module 505 determines the application-specific features $F_r$ for the initial set of applications. In one embodiment, the attributes may include attributes related to the applications' various functionalities. The attributes may also include other data, such as the number of times the applications were clicked or downloaded for the provided input Q, the current overall popularity of the applications, popularity of the applications with respect to a given partner, etc. The attributes may additionally include spam-scores, security or privacy data about the applications, etc. The attributes may further include information about the developer and/or publisher of the applications. The attributes may moreover include arbitrary binary data which are determined at data build time, and correspond to attributes that are developed after implementation of the system.

In one embodiment, the post-processing module 525 processes any search results to generate a final results list. More specifically, the post-processing module 525 may obtain display-related metadata for the results, such as application images (e.g., application screenshots), application descriptions, application videos, etc. In one embodiment, the post-processing module 525 may restrict the number of results in the list that are from a single application developer or platform. In one embodiment, the post-processing module 525 may cluster or otherwise organize the results by concept. In doing so, the list of results may be modified from its default sort-by-score order. In one embodiment, the post-processing module 525 may format the results such that specific editions of an application most relevant to the query are emphasized. In particular, the search results can be organized by the canonical application structures, as generated through the previously discussed clustering. In one embodiment, information from related application editions may be retrieved to improve the quality of the search results, even if a user searches only for a particular application edition (e.g., an application for a certain platform).

In one embodiment, the post-processing module 525 formats the search results such that the user may obtain specific information regarding editions of an application by selecting the application (e.g., by clicking on a link associated with the application). In another embodiment, a number of editions merged with the canonical application are shown as a tooltip and/or on the search result row along with the canonical application.

The behavior analysis module 530 monitors the actions of the partner that provided the query. For example, the system can determine which applications were eventually viewed or downloaded by the partner, etc. Such information can be analyzed to further extract attributes for the applications. The extracted attributes may be used to later influence the performance of subsequent searches performed by the application search module 115.

Process for Merging Application Editions

Figure 6:
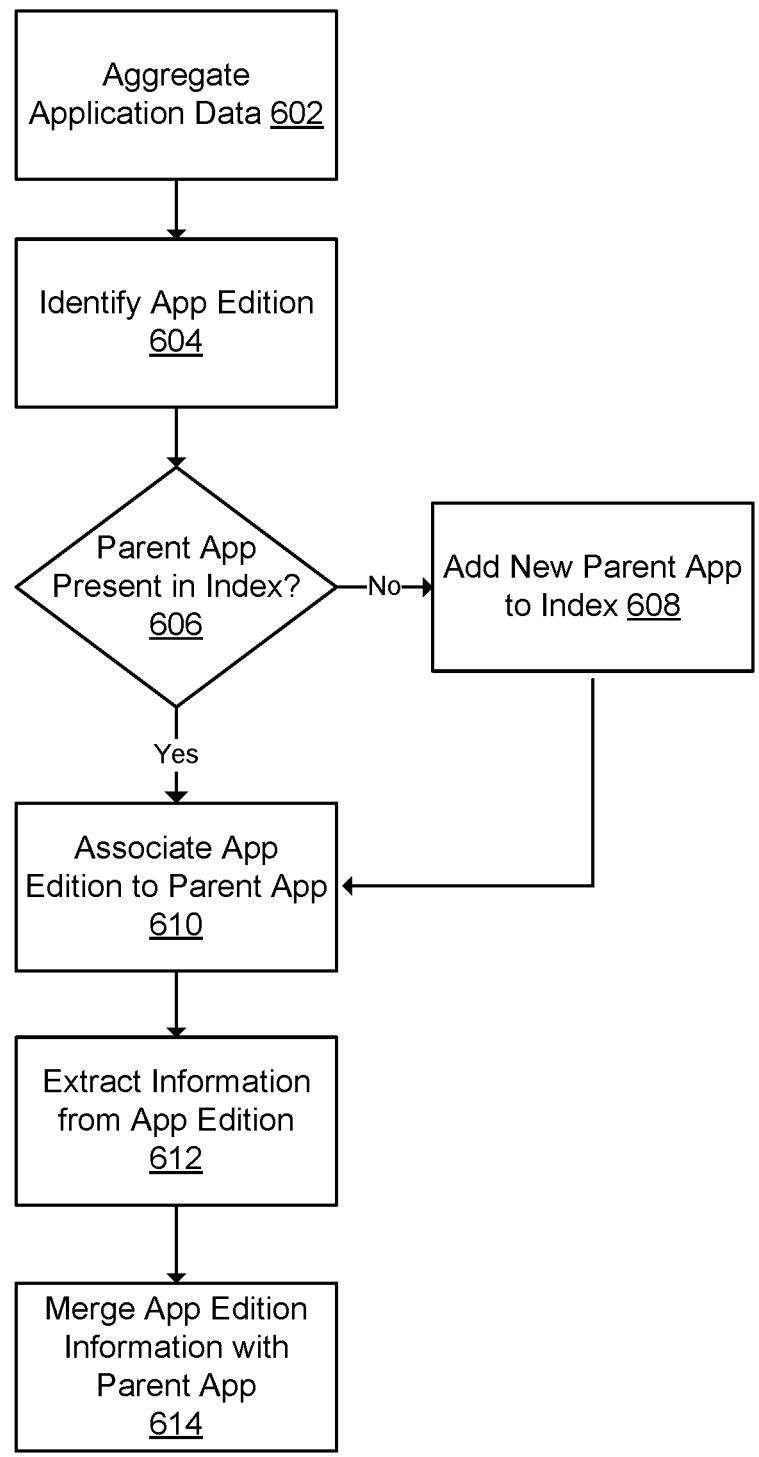
FIG. 6 is a flow chart illustrating an example method for merging editions of an application, according to one embodiment.

FIG. 6 illustrates a method for merging editions of an application to create a canonical application in an application index, in accordance with an embodiment. Other embodiments can perform the steps of the method in different orders and can include different, additional, and/or fewer steps. The process shown in FIG. 6 can be performed by the indexing module 210. In particular, the indexing module 210 aggregates 602 information for one or more application editions from various data sources. The data sources may include, for example, an unstructured database, websites, online catalogs, online application stores, etc., and the data gathered can include data for various editions of one or more applications. Furthermore, the data can be structured, semi-structured, or unstructured. As used herein, "structured application data" refers to application data that is specifically associated with a particular data field. For example, structured application data may include an application name explicitly defined in a title data field. The term "unstructured application data" refers to application data not specifically associated with a particular data field. Unstructured application data may be in free form, such as data received from the sources 135. The term "semi-structured application data" refers to application data that at a broad level is associated with a particular data field but the text within the data field is provided in an unstructured manner. For example, an item of application data may be broadly associated with a description data field. The item of application data, however, may include paragraphs of text, which at a granular level may be considered unstructured. In some implementations, the type of application data (structured, unstructured, or semi-structured) may influence the manner in which the data is processed and be used to facilitate application searches. For example, information for various application editions may be crawled through various websites that may be specific for distribution of the application editions. In one embodiment, the information about the various application editions may be entered manually by, for example, an author of the application edition or by an application market webmaster. The input information for an application edition can include the edition's name and its description.

The indexing module 210 analyzes the aggregated information to identify 604 an application edition. In one embodiment, the indexing module 210 calculates a score quantifying the similarity of two or more applications based on metadata associated with each application. After identifying an edition, the indexing module 210 determines 606 whether a canonical application of a particular application edition exists in the application index 408. If it is determined that the canonical application structure is not present in the index, the indexing module 210 creates a new canonical application and adds 608 the new canonical application to the index. Information for the particular application edition may also be extracted and added to a description of the new canonical application.

If a canonical application already exists in the index, the indexing module 210 identifies the existing canonical application structure and associates 610 the application edition with the canonical application structure. The edition is also added to the index. The indexing module 210 then extracts 612 information from the edition or information related to the edition. This information is merged 614 with information associated with the canonical application structure, where the canonical application structure includes indexed locations for the actual application editions. In particular, the application edition is tagged with metadata and stored within the canonical application structure. The metadata may contain information about the internal storage of the actual application edition.

Figure 7A:
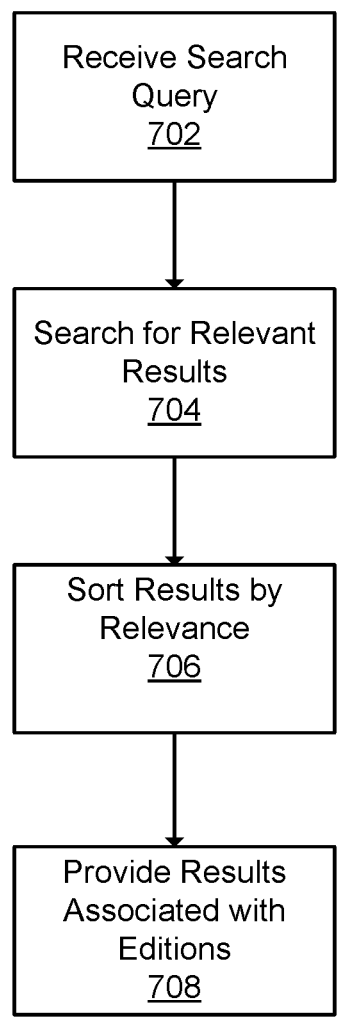
FIG. 7A is a flow chart illustrating an example method for providing search results in relation to application editions, according to one embodiment.

FIG. 7A is a flow chart illustrating an example process for providing search results in relation to application editions in accordance with an embodiment. The editions may be made available as part of a canonical application corresponding to user queries. The process shown in FIG. 7A can be performed by the application search module 115. Other embodiments can perform the steps of the process in different orders and can include different, additional, and/or fewer steps.

The application search module 115 receives 702 a search query from a partner. The query may be syntactically and semantically analyzed, and parsed into a sequence of tokens. Based on the search query, the application search module 115 identifies 704 relevant results. In one embodiment, the application search module 115 may use one or more generated search indexes to identify the results. In one embodiment, the identified results may include those canonical applications that best match an expressed functionality indicated in the received search query. After identifying the applications, the application search module 115 sorts 706 the application set based on machine learning. Finally, the application search module 115 provides 708 search results specifying the canonical applications to the user. For example, the search results may be formatted as a list of canonical applications matching the search query. In one embodiment, the search results may include any suitable information and/or metadata corresponding to the various editions associated with the canonical application. The information and/or metadata may also be provided 708 to the user.

Figure 7B:
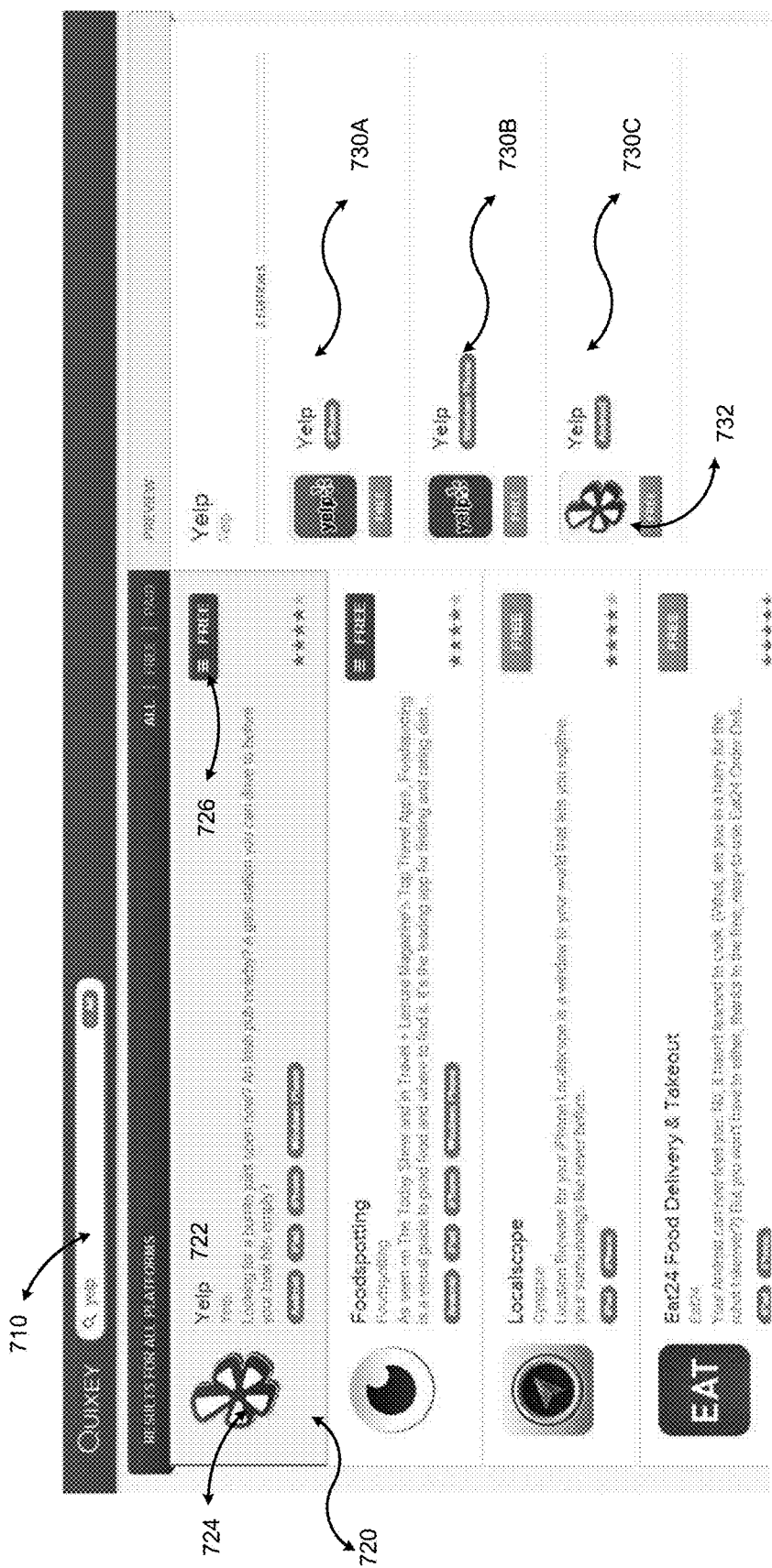
FIG. 7B is a screen shot illustrating an example user interface for providing search results in relation to application editions, according to one embodiment.

FIG. 7B illustrates a screen shot of a results list that may be displayed on a client device used by a partner or end user. The user can enter queries into the search box 710, such as a query for "YELP," and the query is transmitted to the application search system 105 for processing as described with respect to FIG. 7A. The search results provided by the application search module 115 may be formatted as a list of identifiers 720 of the canonical applications, including, for example, a title of the canonical application 722, an image 724, a link to the canonical application, a description and rating of the application, and/or other information. In one embodiment, the user can select an identifier 720 of a canonical application (e.g., click on the list button 726) to retrieve a list of identifiers 730 of editions associated with the canonical application. For example, FIG. 7B illustrates editions of the application "Yelp", with an identifier 730A of an iPhone edition, an identifier 730B of a Windows Phone edition, and an identifier 730C of an Android edition. The user may interact with the identifiers 720, 730 to retrieve more information about the canonical application or editions or link to an application store to purchase and/or download the application.

In one embodiment, the components of the identifiers 720 of canonical applications are selected based on the associated editions. For example, the image 724 may be selected from the images 732 of the corresponding editions, based on a common logo, word, color, etc., of the images 732. As another example, the title 722 of the canonical application may be selected based on common words in the titles of the application editions.

The embodiments described herein beneficially allow application search systems to provide higher quality search results. More specifically, by clustering similar editions under a canonical application, all similar editions of an application may be displayed to a user in a condensed form. That is, by providing search results based on canonical applications, users may be provided with more meaningful application search results. In particular, user perception of an application often transcends the details of its implementation; users often perceive different editions of an application as the same. As such, by presenting users with search results based on canonical applications rather than individual editions, search results can appear less cluttered and less duplicative.

In addition, clustering applications and cross-referencing their information for search purposes may beneficially allow a larger corpus of data for an application to be considered in searches. For example, a first edition of an application may be associated with two user reviews. A second edition of the application may have been described in an article posted online. The two reviews and the article can both be considered in searches for and ranking of the application.

Computing Machine Architecture

Figure 8:
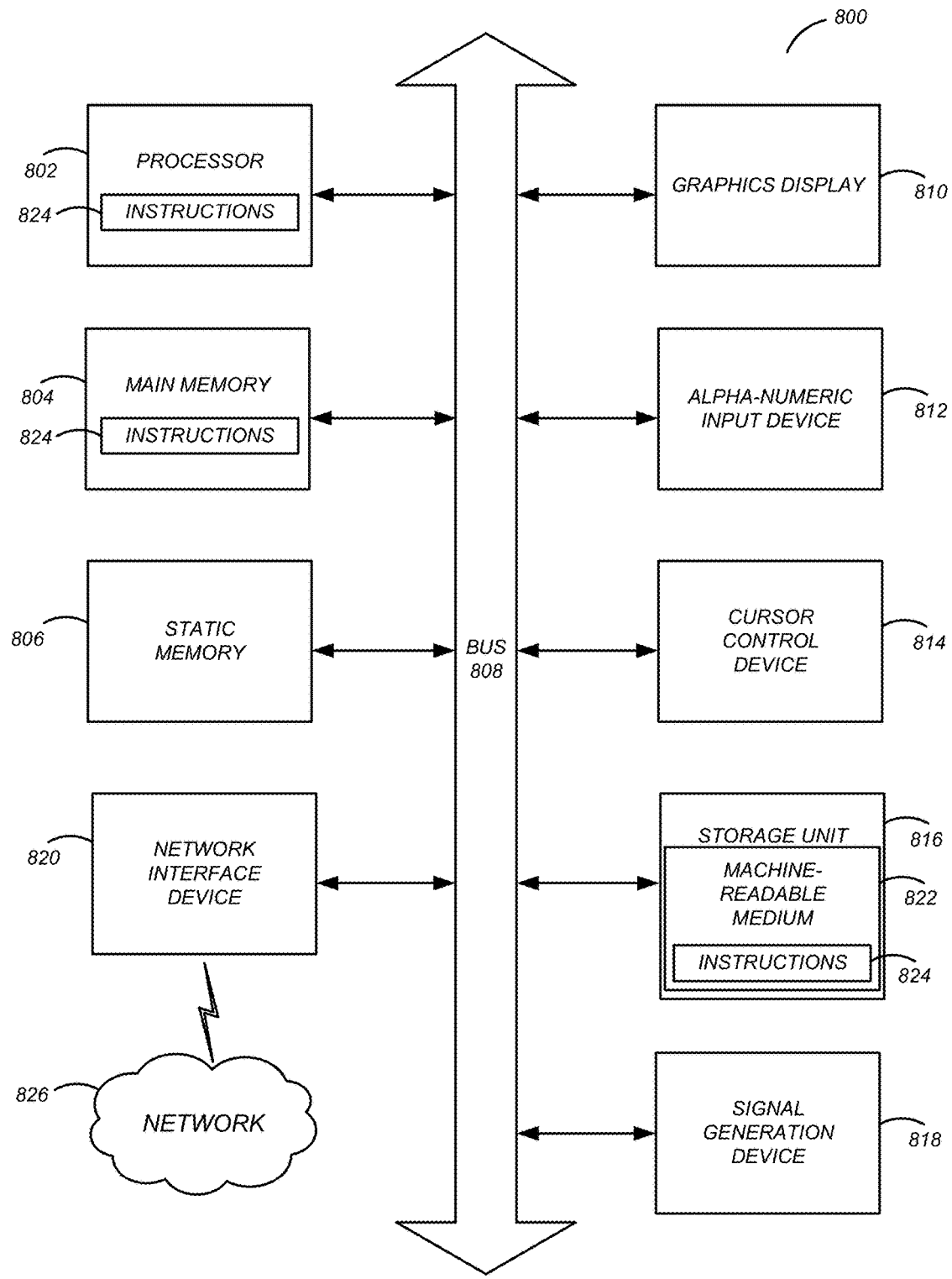
FIG. 8 illustrates one embodiment of components of an example machine able to read instructions from a machine-readable medium and execute the instructions in a processor (or controller).

FIG. 8 is a block diagram illustrating components of an example machine able to read instructions from a machine-readable medium and execute them in a processor (or controller), as an example of the search system 105, partners 125, or client devices. Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 8. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 802) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA), an application-specific integrated circuit (ASIC), system on a chip (SoC), chipset) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled,"

however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating search results based on identified application editions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An application search system comprising:
   a data processing module that
      generates a plurality of canonical application structures each identifying (i) a canonical application, (ii) a plurality of application editions associated with the canonical application, and (iii) respective attributes associated with the plurality of application editions, and
      generates a plurality of search indexes that collectively index the plurality of canonical application structures based on the respective attributes of each respective canonical application structure, wherein each search index corresponds to a particular application attribute of a plurality of possible application attributes and indexes a subset of the plurality of canonical application structures that identify the particular application attribute; and
   an application search module that
      receives a search query from a user,
      extracts one or more query features from the search query,
      selects one or more search indexes of the plurality of search indexes based on the one or more query features extracted from the search query and the particular application attributes respectively corresponding to the one or more search indexes,
      identifies an initial set of canonical application structures using the selected one or more search indexes based on the search query,
      generates search results based on the initial set of canonical application structures, and
      provides the search results to the user.

2. The application search system of claim 1, wherein the respective attributes include at least one of attributes common to each application edition and attributes specific to respective application editions.

3. The application search system of claim 1, wherein the data processing module:
   receives data from one or more data sources, wherein the received data includes information about the respective attributes of the plurality of application editions; and
   to generate the plurality of search indexes, extracts the respective attributes from the received data.

4. The application search system of claim 1, wherein the respective attributes correspond to functional aspects of the plurality of application editions.

5. The application search system of claim 1, wherein the application search module further receives contextual information associated with the search query, and wherein, to generate the search results, the application search module generates the search results further based on the contextual information.

6. The application search system of claim 5, wherein (i) the contextual information includes a platform constraint associated with the user and (ii) to generate the search results further based on the contextual information, the application search module generates the search results by selecting at least one canonical application based on the platform constraint.

7. The application search system of claim 1, wherein, to select the at least one of the search indexes, the application search module selects the one or more search indexes based on at least one feature extracted from text contained in the search query.

8. The application search system of claim 1, wherein each of the search indexes is associated with a respective platform.

9. The application search system of claim 8, wherein, to select the one or more search indexes, the application search module determines a platform associated with the user based on the search query and selects the one or more search indexes based on the determined platform.

10. The application search system of claim 1, further comprising at least one processor that executes functions of the data processing module and the application search module.

11. A method for operating an application search system, the method comprising:
   generating a plurality of canonical application structures each identifying (i) a canonical application, (ii) a plurality of application editions associated with the canonical application, and (iii) respective attributes associated with the plurality of application editions;
   generating a plurality of search indexes that collectively index the plurality of canonical application structures based on the respective attributes of each respective canonical application structure, wherein each search index corresponds to a particular application attribute of a plurality of possible application attributes and indexes a subset of the plurality of canonical application structures that identify the particular application attribute;

receiving a search query from a user;

extracting one or more query features from the search query;

selecting one or more search indexes of the plurality of indexes based on the search query and the particular application attributes respectively corresponding to the one or more search indexes;

identifying an initial set of canonical application structures using the one or ore selected search indexes based on the search query;

generating search results based on the initial set of canonical application structures; and providing the search results to the user.

12. The method of claim 11, wherein the respective attributes include at least one of attributes common to each application edition and attributes specific to respective application editions.

13. The method of claim 11, further comprising:

receiving data from one or more data sources, wherein the received data includes information about the respective attributes of the plurality of application editions; and extracting the respective attributes from the received data to generate the plurality of search indexes.

14. The method of claim 11, wherein the respective attributes correspond to functional aspects of the plurality of application editions.

15. The method of claim 11, further comprising receiving contextual information associated with the search query, wherein generating the search results includes generating the search results further based on the contextual information.

16. The method of claim 15, wherein (i) the contextual information includes a platform constraint associated with the user and (ii) generating the search results further based on the contextual information includes generating the search results by selecting at least one canonical application based on the platform constraint.

17. The method of claim 11, wherein selecting the one or more search indexes includes selecting the one or more search indexes based on at least one feature extracted from a text portion of the search query.

18. The method of claim 11, wherein each of the plurality of search indexes is associated with a respective platform.

19. The method of claim 18, wherein selecting the one or more search indexes includes determining a platform associated with the user based on the search query and selecting the one or more search indexes based on the determined platform.

* * * * *